United States Patent [19]

Firnhaber et al.

[11] Patent Number: 4,971,777

[45] Date of Patent: Nov. 20, 1990

[54] PROCESS FOR THE REMOVAL OF ACID COMPONENTS AND NITROGEN OXIDES FROM THE WASTE GASES OF INDUSTRIAL FURNACES

[75] Inventors: Bernhard Firnhaber; Karl Schmid, both of Essen; Cort Starck, Dorsten; Hans-Werner Gosch; Richard Wenderoth, both of Essen; Rolf Wetzel, Heiligenhaus; Wolfgang Schulte, Monheim, all of Fed. Rep. of Germany

[73] Assignee: Krupp Koppers GmbH, Essen, Fed. Rep. of Germany

[21] Appl. No.: 271,094

[22] Filed: Nov. 14, 1988

[30] Foreign Application Priority Data

Nov. 19, 1987 [DE] Fed. Rep. of Germany ....... 3739162

[51] Int. Cl.$^5$ ...................... C01B 17/00; C01B 21/00
[52] U.S. Cl. .................................... 423/235; 423/242
[58] Field of Search ................... 423/239, 235, 242 A, 423/242 R

[56] References Cited

U.S. PATENT DOCUMENTS 4,541,999 9/1985 Bechthold et al. ................. 423/235
4,564,510 1/1986 Bechthold et al. ................. 423/235

FOREIGN PATENT DOCUMENTS 56-37029 4/1981 Japan .................................... 423/239

Primary Examiner—Gregory A. Heller
Attorney, Agent, or Firm—Michael J. Striker

[57] ABSTRACT

The process removes acid components including sulfur oxides and nitrogen oxides from the exhaust gases of industrial furnaces and includes oxidizing the nitrogen oxide contained in the exhaust gases with the oxygen contained in the exhaust gases at a exhaust gases temperature between 300° and 900° C. before entry of the gases into a first absorption stage, with an addition to the exhaust gases of an organic compound, preferably methanol, as a radical former. After oxidation of nitrogen oxides the exhaust gases undergo a two-stage absorption using aqueous ammonium salt solutions as absorption liquid, whose pH-value is continuously adjusted to less than 5 by addition of aqueous ammonia solution. The mol ratio of $NO_2$ to $SO_2$ in the exhaust gases introduced to the second absorption stage is maintained between 0.01 and 0.5 by diverting a portion of the exhaust gases prior to the first absorption stage to the second absorption stage. The salt solutions obtained thereby are neutralized together and evaporated, whereby the salts so produced, after pelletization or granulation represent a useful fertilizer.

15 Claims, 2 Drawing Sheets

4,971,777

PROCESS FOR THE REMOVAL OF ACID COMPONENTS AND NITROGEN OXIDES FROM THE WASTE GASES OF INDUSTRIAL FURNACES

BACKGROUND OF THE INVENTION

The invention concerns a process for the removal of acid components and nitrogen oxide from the exhaust gas from industrial furnaces, by oxidizing the nitrogen oxide and subjecting the exhaust gas to a two-stage absorption employing aqueous ammonium salt solutions as absorption liquid, whereby the ammonium salt contained in the absorption liquid is obtained in the process itself through the employment of aqueous ammonia solution and are separated in connection with the gas treatment by means of evaporation of the absorption liquid.

In recent years a number of processes are known which serve the purpose of decreasing through suitable measures the environmental loading caused by the exhaust gases from industrial furnaces, particularly the exhaust gases from coal- and/or oil-burning power plants. In this regard, numerous suggestions are disclosed in the literature for the simultaneous separation of $SO_x$ and $NO_x$ from these exhaust gases. These processes employ herewith not only washing but also dry methods for the separation of these components. A process of the above-depicted type is described, for example, in "Chemie-Ingenieur-Technik", 57 (1985), pages 720–722. With these techniques, known as the Walter Simultaneous Processes, the exhaust gases, after utilization of a part of the heat content for spray drying of the product salts, are initially introduced to a desulfurization with aqueous ammonia solution. In the desulfurized gas, the nitrogen oxide is brought to a higher oxidation stage by means of addition of ozone and/or ozonized air. The higher oxidized nitrogen oxides are then washed in a second washing stage with aqueous ammonia solution. The concentrated salt solutions from both washing stages are after-oxidized with air, therewith only providing yet sulfate and nitrate, and thereafter introduced together to the spray drying.

Tests of these processes in large-scale employment have proven that the desulfurization leads to that degree of desulfurization required in practice only at a pH-value from 5 on up. These pH-values, however, lead to an increased $NH_3$-partial-pressure which favors the formation of aerosols of the ammonium salts. These aerosols, which exit in the form of a so-called white vapor from the chimney from behind the waste gas washing, likewise represent an environmental burden, which must be thwarted. Indeed, the separation of these aerosols requires the construction of special filters. This is, however no satisfactory answer to the problem, since on the one hand the construction of a suitable filter system necessitates considerable investment costs, and on the other hand, on account of high pressure loss in the filter, the operational costs of the plant are increased undesirably in extent. The nitrogen oxide washing reaches in these processes the required degree only when the oxidation of the nitrogen oxide follows up to the anhydride of nitric acid, $N_2O_5$. In order to attain this degree of oxidation with the use of ozone as oxidation agent a mol ratio of ozone to $NO_x$ in the exhaust gas of at least 1.5 is required. This high ozone requirement signifies, however, high operational and investment costs.

SUMMARY OF THE INVENTION

The invention is therefor based upon the object of further developing the processes of the above mentioned type so that the recited disadvantages are avoided. The process according to the invention should thus be distinguished in particular by a low operations and investment expenditure, and to so lower the content of acid components and nitrogen oxide in the exhaust gases that the official (governmental) standards can be satisfied completely.

The process according to the present invention which satisfies these objectives is characterized by the following process steps:

(a) The gas to be treated is fed into the process with an oxygen content amounting to at least 0.5 vol-%;
(b) the nitrogen oxide contained in the gas is oxidized with the oxygen contained in the gas, before entry into the first absorption stage by the gases, at a gas temperature from 300° to 900° C., organic compounds being added to the gas which decompose partially or completely into radicals at the particular temperature conditions;
(c) both absorption stages are operated with absorption liquid having pH-value less than 5;
(d) in the gas introduced into the second absorption stage, the mol ratio of $NO_2$ to $SO_2$ is so adjusted as to lie in the range between 0.1 and 0.5; and
(e) the salt solutions produced in both absorption stages are neutralized before evaporation with aqueous ammonia solution.

That is, the invention provides a reaction of the nitrogen oxide contained in the exhaust gas with the oxygen likewise contained in the exhaust gas, according to the reaction formula $$2NO + O_2 \rightarrow 2NO_2.$$

Accordingly, it is necessary according to the invention that the exhaust gas to be treated display an oxygen content of at least 0.5% by volume. To the extent that the gas does not already display such an oxygen content, an addition of oxygen and/or air must be provided so as to maintain this value. In general, this oxidation reaction proceeds extremely slowly under the conditions normally prevailing in the exhaust gas pathway. It has, however, been discovered, that the reaction velocity can be elevated so much through the incorporation of a radical reaction that the reaction can be performed within a technically feasible time period. The radical reaction follows according to the present invention by means of addition of organic compounds, particularly alkanes or alcohols, to the exhaust gas at a temperature which decomposes the particular substance(s) with radical formation. Examples of different radical forming substances and their effective temperature ranges are set forth in the following table:

| Substance | Effective Temperature Range °C. for Radical Formation |
|---|---|
| Methane | 600–750 |
| Methanol | 550–750 |
| n-Hexane | 300–400 |

The dosing of methanol to the exhaust at temperatures between 600° and 700° C. has proven to be particularly effective for the acceleration of NO-oxidation by means of oxygen.

The amount of the organic compounds added to the gas as radical former is directed naturally to the particularly employed substances and is dependent upon the number of C-atoms contained therein. Herewith the addition of organic compounds is always measured so that the mol ratio $C/NO_x$ is less than or equal to 10, preferably 1.0 to 4.0. With employment of methanol one operates with a mol ratio methanol/$NO_x$ which is less than or equal to 6, preferably 1.5 to 2.5.

The oxidation of nitrogen oxide ($NO_x$) is performed until an oxidation stage from $x=1.5$ to 2.0, preferably $x=1.8$ to 2.0. This means that a substantial part of the NO prevailing in the exhaust gas is oxidized into $NO_2$. To the extent that the oxidation of the nitrogen oxide with help from the above set forth radical reaction is not sufficient to attain the desired degree of oxidation, an additional after-oxidation can be performed with the help of ozone and/or ozonized air. Herewith this after-oxidation is performed at a temperature of the gas from 30° to 130° C. in such manner that the ozone and/or ozonized air are added to the gas directly before its entry into the washer of the first absorption stage. The necessary amounts of ozone obviously lie below the amounts required for an oxidation of the nitrogen oxide performed exclusively with ozone and/or ozonized air.

With performance of the process according to the present invention, initially the $SO_2$ contained in the exhaust gas is reacted with the aqueous ammonium salt solution circulating in the washers of both absorption stages, with formation of ammonium sulfite or -bisulfite. The sulfite ions provided herewith in the absorption liquid effect for their part a reduction of the nitrite to nitrogen, whereby the sulfite ions are oxidized into sulfate ions. Previously, it was not, however, possible to utilize this reaction for the simultaneous absorption of $NO_x$ and $SO_2$ from the exhaust gases, since the sulfite ions necessary for a reduction of the nitrite to a sufficient extent and therewith for a sufficient $NO_x$-washing-out from the exhaust gas were not available to a sufficient measure. This can be explained as follows: under the catalytic influence of $NO_2$ the oxidation of the sulfite ions with the oxygen of the exhaust gas according to the reaction equation

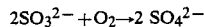

$$2SO_3^{2-} + O_2 \rightarrow 2\ SO_4^{2-}$$

proceeds at a higher reaction velocity than the nitrite reduction. According to the present invention, however, one accomplishes by means of adjustment of the pH-value of the absorption liquid in the first absorption stage to a value of less than 5 a repression of this oxidation reaction, to such an extent that the simultaneous absorption of $NO_x$ and $SO_2$ leads to a sufficient $NO_x$-removal. An equimolar mixture of NO and $NO_2$ reacts as follows:

$$N_2O_3 + 3SO_2 + 3H_2O \rightarrow N_2 + 3\ H_2SO_4$$

$NO_2$, or $N_2O_4$ provided in equivalent weight reacts according to

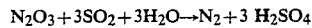

$$N_2O_4 + 4SO_2 + 4H_2O \rightarrow N_2 + 4H_2SO_4$$

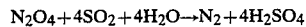
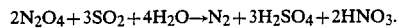

$$2N_2O_4 + 3SO_2 + 4H_2O \rightarrow N_2 + 3H_2SO_4 + 2HNO_3.$$

$N_2O_4$ displays, in contrast to $N_2O_3$, a higher solubility in aqueous solutions. Therefore, the $NO_x$-washing-out according to the above reactions is faster and more complete at high $NO_2/NO$-mol ratios. For the process of the present invention, an $NO_x$-oxidation stage from $x=1.8$ to 2.0 is preferred.

Depending upon the $NO_x$- and $SO_2$-concentrations, as well as the degree of oxidation of $NO_x$, there follows in the first absorption stage a more or less complete $SO_2$-washing-out from the exhaust gas. The second absorption stage is necessary in order to reduce the $SO_2$-concentration to the required limit value. This $SO_2$-residual washing-out follows according the the present invention under the catalytic influence of $NO_2$, for which the mol ratio of $NO_2$ to $SO_2$ in the gas is so adjusted in this stage of washing that it lies in the range between 0.01 and 0.5, preferably from 0.1 to 0.2. For this purpose a smaller partial stream of the exhaust gas to be oxidized can be diverted before the washer of the first absorption stage and added to the gas for the second absorption stage. The pH-value of the absorption liquid in this stage should also be less than 5. A pH-value of 4.5 has proven to be particularly favorable. With such a pH-value a good degree of washing-out is attained without aerosol formation.

The adjustment of the pH-value of the absorption liquid in both absorption stages follows through addition of aqueous ammonia solutions so that after neutralization of the solutions a 50–98% saturation of the solutions is attained by means of ammonium salts. The laden solutions running from the washers contain, in addition ammonium sulfate and -nitrate, ammonium salts of more highly acidic trace components in the exhaust gas, such as chloride and fluoride, as well as, corresponding to the pH-value, ammonium bisulfate, sulfuric acid and nitric acid. These are introduced to a common neutralization container. The neutralization follows likewise through addition of aqueous ammonia solution.

An after-oxidation is not necessary, so that the neutralized solution can be immediately forwarded to the evaporation and drying. These stages can be performed in different ways, for example in a fluidized bed drier or a spray drier or spray evaporator. Insofar as the latter is the case, a partial stream of the hot gases can be branched off before entry into the first absorption stage and be led into the spray drier for evaporation of the absorption liquid. Subsequently, this partial stream, which amounts to an order of magnitude of ca. 10 vol-%, is reunited with the rest of the gas before entry into the first absorption stage. In connection with the evaporation and drying, the ammonium salts discharged from the process are pelletized or granulated. They represent a useful fertilizer.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
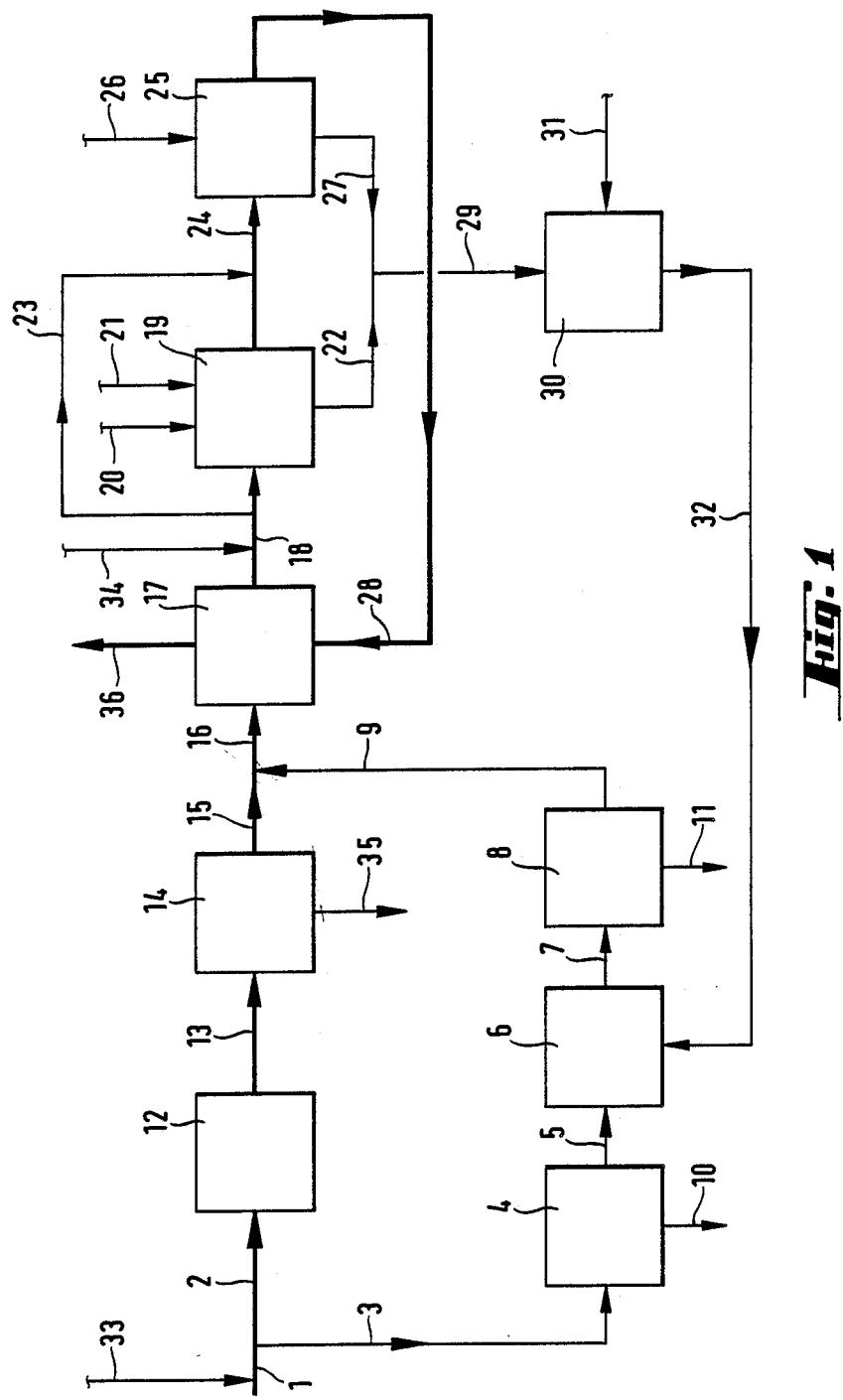
FIG. 1 is a schematic flow chart representation of the process according to the present invention, employing for the evaporation of the absorption liquid a spray drier through which is fed a partial stream of the hot waste gases.

In the flow chart represented in FIG. 1, numerical designation 1 applies to an exhaust gas conduit which is connected to an optionally chosen industrial furnace. A radical former is dosed into the exhaust gas through conduit 33 in such an amount that the major part of the NO in the exhaust gas is oxidized to $NO_2$. The gas is partitioned before air warmer 12. About 10% by volume of the exhaust gases are led across conduit 3 to the hot gas dust removal 4 and then led across conduit 5 into the drier 6, in which there is a feed-in by way of conduit 32 for the spraying in of ammonium salt solution (also recovered in the process). The drier 6 involves in this case a spray drier or spray evaporator. The dust from the dust removal 4 is discharged across conduit 10. The gas containing the dried salt is introduced across conduit 7 to the separator 8. The spray-dried salts are discharged across conduit 11 and pelletized or granulated in known manner into a commercially useful product. The ammonium salt-freed gas is mixed together across conduit 9 with the main amount of exhaust gas in conduit 15. The main amount of exhaust gas is fed across conduit 2, the air pre-warmer 12 and conduit 13 to the electrofilter 14, where the exhaust gas is dusted out and the dust is discharged across conduit 35. The dust-freed exhaust gas is further led across conduit 15 and introduced to heat exchanger 17 after uniting with the branched stream from conduit 9 across conduit 16. After the heat exchanger 17 the exhaust gas is introduced according to the present invention across conduit 18 to a first absorption stage 19. In conduit 18, ozone or ozonized air can be provided by way of conduit 34, when in this place, supplementary or alternatively to the radical oxidation, NO is supposed to be oxidized into $NO_2$.

In the washer of the first absorption stage 19 $NO_3$, the major part of the $SO_2$, as well as other acid components in the exhaust gas, such as e.g. $SO_3$, HCl, HF, among others, are washed out by means of an ammonium salt-containing aqueous solution which is led in circulation. For adjustment of the pH-value of the washing solution, aqueous ammonia solution is introduced to the washer across conduit 20. In addition, water is introduced across conduit 21, in order to replace the amount which is lost by evaporation. The produced amount of salt solution is continuously discharged across conduit 22.

The exhaust gas leaving the first absorption stage 19 is introduced across conduit 24 to the second absorption stage 25. In this stage, the residual $SO_2$ is washed out with the presence of catalytically acting $NO_2$-concentrations. The necessary $NO_2$-concentration is adjusted either through the degree of washing out in the first absorption stage 19 or by by-passing this stage with a part of the $NO_x$-containing gases across conduit 23. The washing solution in the washer of the second absorption stage 25 is likewise maintained to a constant pH-value through addition of aqueous ammonia solution across conduit 26. The produced salt solution is discharged across conduit 27.

The exhaust gas leaving the second absorption stage 25 is led across conduit 28 to the heat exchanger 17 and from there to the chimney across conduit 36. An aerosol separation is not necessary in this case, and therefore also not provided.

The salt solutions obtained in both washing stages are united in conduit 29 and introduced to the neutralization container 30, where the acids are brought to the ammonium salts across conduit 31. The neutralized solution is led across conduit 32 to the drier 6. It contains only traces of ammonium nitrite and -sulfite and requires no after-oxidation for the provision of a useful fertilizer.

Figure 2:
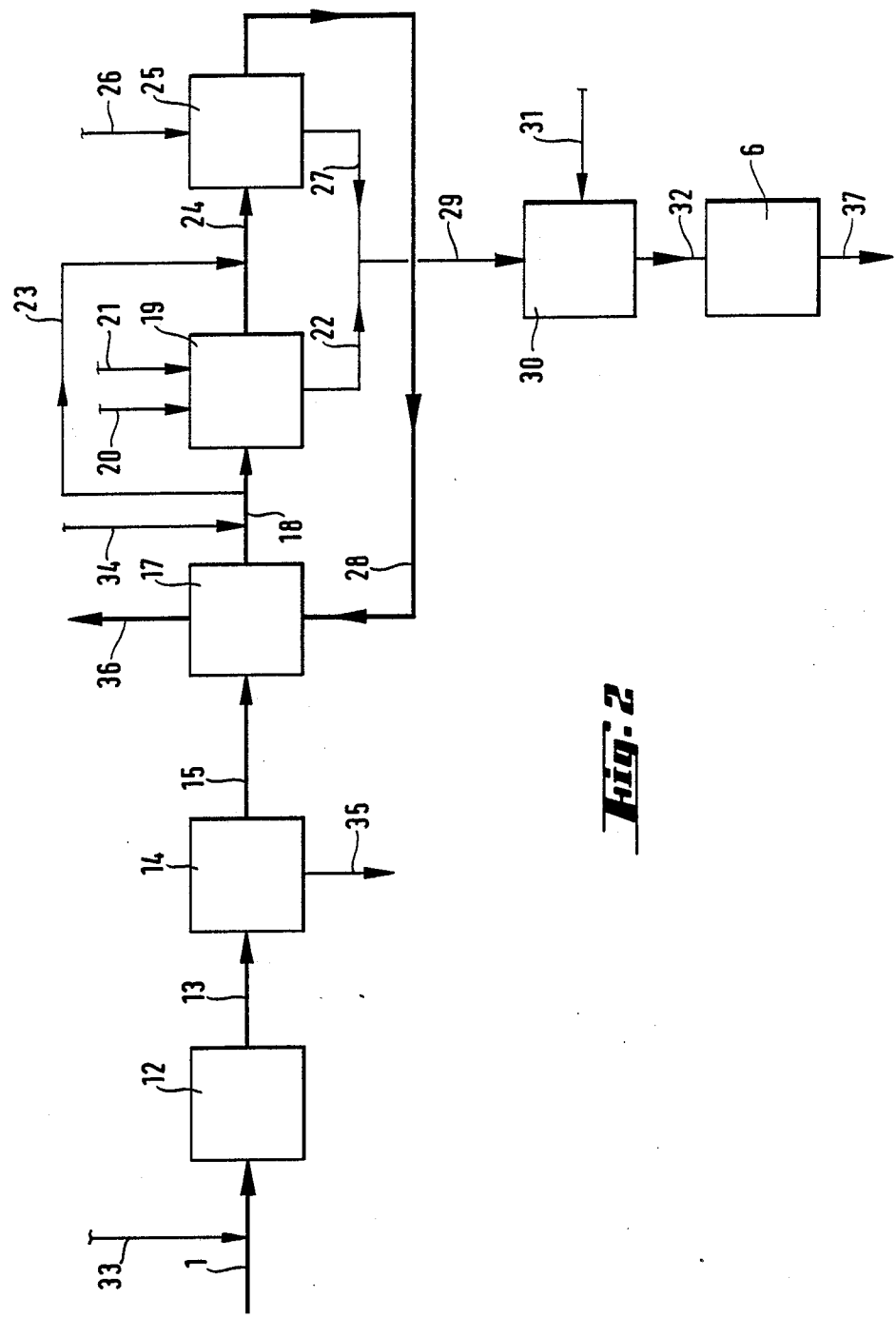
FIG. 2 is a schematic flow chart representation of the process according to the present invention, in which a drier of any optional type construction is employed.

The process scheme indicated in FIG. 2 corresponds essentially to the process scheme from FIG. 1, whereby numerical designations have the same meaning. In contrast to the course of the process according to FIG. 1, here in general the drier 6 is not a spray drier, but any optional other drier construction is provided. The exhaust gas to be treated is therefore not distributed into two partial streams, but led in its entirety across conduit 1 into the air pre-warmer 12 as well as the subsequently associated arrangements for the gas treatment. The drier 6 is located therewith directly behind the neutralization container 30. The salts occurring in the drier 6 are introduced across conduit 37 to the pelletization or granulation.

The advantages of the process according to the present invention are substantiated by means of the following operational example, which involves the treatment of the exhaust gas from a power plant.

A coal-fired furnace of the power plant spews 500 000 $m^3/h$ exhaust gas with an $SO_2$-content of 2600 $mg/m^3$ and an $NO_x$-content of 850 $mg/m^3$ (calculated as $NO_2$) and an $O_2$-content of 5.3 vol-%. In the heating system of the power plant furnace, 530 kg/h methanol are dosed into the gas stream having exhaust gas temperature of 650° C. The radical reaction thereby precipitated effects the oxidation of NO to $NO_2$ as well as a reaction of $NO_x$ into $N_2$ of about 20%.

After dust removal and heat exchange the exhaust gas is introduced to the first absorption stage 19, in which the absorption liquid led in circulation is maintained at a pH-value of 1.5 by means of addition of aqueous ammonia solution. For this, 140 kg/h of ammonia are required.

The exhaust gas from the first absorption stage 19 still contains 1760 $mg/m^3$ $SO_2$ and 170 $mg/m^3$ $NO_x$. It is further purified in the second absorption stage 25 at a pH-value of the washing solution of 4.5. This stage receives an addition of 420 kg/h $NH_3$ in aqueous solution.

The exhaust gas leaving the second absorption stage is led to the chimney across heat exchanger 17 without any further treatment. Its content of harmful substances, at 130 $mg/m^3$ $NO_x$ and 190 $mg/m^3$ $SO_2$, lies below the lawfully prescribed limit values. No aerosol formation occurs upon exiting of the gases from the chimney.

The salt solutions discharged from both absorption stages are neutralized in neutralization container 30 by means of the addition of 120 kg/h ammonia, and sprayed into the drier 6. Hourly, 5124 kg dry salts are discharged from the drier. The content of chemically bound nitrogen in these product salts amounts to 21.3% by weight.

It will be understood that each of the elements described above, or two or more together, may also find a useful application in other types of processes differing from the types described above.

While the invention has been illustrated and embodied by description as a process for the removal of acid components and nitrogen oxides from the waste gases of industrial furnaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute the essential characteristics of the generic or specific aspects of this invention.

What is claimed as new and desired to be protected by Letters Patent is set forth in the appended claims.

We claim:

1. A process for removal of acid components including sulfur oxides ($SO_x$ including $SO_2$) and nitrogen oxides ($NO_x$) from exhaust gases of industrial furnaces, comprising the steps of oxidizing the nitrogen oxides and subjecting the exhaust gases to a two-stage absorption using aqueous ammonium salt solution as absorption liquid, ammonium salts contained in said absorption liquid being produced in the process by feeding exhaust gases and an aqueous ammonia solution to said absorption liquid and separated in conjunction with said process by evaporating said absorption liquid, the process comprising the following process steps:
   (a) introducing the exhaust gases to be treated with an oxygen content of at least 0.5% by volume;
   (b) oxidizing said nitrogen oxides contained in said exhaust gases with said oxygen contained in said gases at a gas temperature from 300° to 900° C. before entry of said gases into a first absorption stage of said two-stage absorption, with addition of organic compounds to the exhaust gases, said organic compounds decomposing at least partially into radicals at said temperature;
   (c) operating said absorption stages with absorption liquid having a pH-value less than 5, whereby complete $NO_x$ absorption is attained and ammonia vaporization is suppressed providing a cleaner stack emission;
   (d) adjusting a mol ratio of $NO_2$ to $SO_2$ in said exhaust gases introduced into a second absorption stage of said two-stage absorption to a range between 0.01 and 0.5; and
   (e) neutralizing salt solutions produced in both of said absorption stages before evaporation with aqueous ammonia solution.

2. The process according to claim 1, wherein said oxidizing said nitrogen oxides ($NO_x$) is performed until $x =$ from 1.5 to 2.0.

3. The process according to claim 2, wherein said oxidizing is performed until $x = 1.8$ to 2.0.

4. The process according to claim 1, wherein said organic compound is methanol and said methanol is added to said exhaust gases containing said nitrogen oxides so that a mol ratio of said methanol to said nitrogen oxides is less than or equal to 6.

5. The process according to claim 4, wherein said mol ratio lies between 1.5 and 2.5.

6. The process according to claim 1, further comprising adding ozone or ozonized air in addition to said organic compounds for said oxidizing said nitrogen oxide, said ozone or ozonized air being added to said gas separately from said organic compounds at a gas temperature from 30° to 130° C.

7. The process according to claim 1, wherein said first absorption stage is operated with absorption liquid having a pH-value less than 3.

8. The process according to claim 1, wherein said second absorption stage is operated with absorption liquid having a pH-value of 4.

9. The process according to claim 1, further comprising pelletizing or granulating ammonium salts discharged from the process.

10. The process according to claim 1, wherein said organic compounds are selected from the group consisting of alkanes and alkanols.

11. The process according to claim 10, wherein said alkane is selected from the group consisting of methane and n-hexane.

12. The process according to claim 1, wherein said pH-value of said absorption liquid is set by addition of aqueous ammonia thereto.

13. The process according to claim 1, wherein said adjusting of said mol ratio of $NO_2$ to $SO_2$ is accomplished by diverting a portion of said exhaust gases prior to said first absorption stage and after oxidizing said nitrogen oxides and feeding said portion directly into said second absorption stage.

14. The process according to claim 1, wherein said organic compounds added in step (b) and said nitrogen oxides in said exhaust gas to be oxidized are in a mol ratio of less than or equal to 10.

15. The process according to claim 14, wherein said mol ratio of said organic compounds to said nitrogen oxides is from 1.0 to 4.0.

* * * * *